United States Patent [19]

Kroner et al.

[11] Patent Number: 5,639,832
[45] Date of Patent: Jun. 17, 1997

[54] PREPARATION OF PRODUCTS OF THE REACTION OF POLYASPARTIMIDE AND AMINO ACIDS AND THE USE THEREOF

[75] Inventors: Matthias Kroner, Eisenberg; Gunnar Schornick, Neuleiningen; Dieter Boeckh, Limburgerhof; Richard Baur, Mutterstadt; Birgit Potthoff-Karl, Ludwigshafen; Volker Schwendemann, Neustadt; Christian Schade, Ludwigshafen; Alexander Kud, Eppelsheim, all of Germany

[73] Assignee: BASF Aktiengesellschaft, Ludwigshafen, Germany

[21] Appl. No.: 507,291

[22] PCT Filed: Feb. 23, 1994

[86] PCT No.: PCT/EP94/00511

§ 371 Date: Sep. 6, 1995

§ 102(e) Date: Sep. 6, 1995

[87] PCT Pub. No.: WO94/20563

PCT Pub. Date: Sep. 15, 1994

[30] Foreign Application Priority Data

Mar. 6, 1993 [DE] Germany ............ 43 07 114.7

[51] Int. Cl.⁶ .................... C08F 283/00; C08G 63/91
[52] U.S. Cl. ..................... 525/419; 525/418; 525/425; 525/432; 252/180; 252/175; 510/501
[58] Field of Search ................ 525/419, 418, 525/425, 432; 252/89.1, 180

[56] References Cited

U.S. PATENT DOCUMENTS 3,846,380  11/1974  Fujimoto et al. .

FOREIGN PATENT DOCUMENTS

| 0 256 366 | 2/1988 | European Pat. Off. . |
| 0 406 623 | 1/1991 | European Pat. Off. . |
| 2 253 190 | 5/1973 | Germany . |

OTHER PUBLICATIONS

J. Med. Chem 16 (1973) 893.

*Primary Examiner*—James J. Seidleck
*Assistant Examiner*—Duc Truong
*Attorney, Agent, or Firm*—Oblon, Spivak, McClelland, Maier & Neustadt, P.C.

[57] ABSTRACT

Process for the preparation of products of the reaction of polyaspartimides and amino acids by reaction of amino acids with polyaspartimides in aqueous medium at pH values at which at least 5% of the amino groups in the amino acids are in non-protonated form in equilibrium with the protonated form, and use of the reaction products obtainable in this way and of products of the reaction of polyaspartimides with alkanolamines or aminated $C_1$–$C_{30}$-fatty alcohol alkoxylates which contain as copolymerized units up to 50 mol % of ethylene oxide and/or propylene oxide per mol of fatty alcohol, as additive to detergents and cleaners, as scale inhibitor and as dispersant.

10 Claims, No Drawings

5,639,832

PREPARATION OF PRODUCTS OF THE REACTION OF POLYASPARTIMIDE AND AMINO ACIDS AND THE USE THEREOF

This application is a 371 of PCT/EP94/00511 filed Feb. 23, 1994.

BACKGROUND OF THE INVENTION

1. Field of the Invention

The invention relates to a process for preparing products of the reaction of polyaspartimide and amino acids and to the use of the reaction products as additive-to-detergents and cleaners, as scale inhibitor and as dispersant.

2. Description of the Related Art

The preparation of polyaspartimides by thermal polymerization of aspartic acid in the presence or absence of other amino acids is disclosed, for example, in U.S. Pat. No. 3,052 655, DE-A-4 023 463 and U.S. Pat. No. 5,057,597.

DE-A-2 032 470 discloses a process for preparing polyaspartic acid hydroxylamides by reacting polyaspartimides with alkanolamines in a solution of dimethylformamide or dimethyl sulfoxide. The reaction products are used as plasma expenders.

DE-A-2 253 190 discloses the use of polyaspartimides reacted with long-chain alkylamines as surfactants in detergents. The reaction is carried out in dimethylformamide as solvent.

J. Med. Chem. 16. (1973) 893 describes the preparation of products of the reaction of polyaspartimides and ethanolamine and the use of the reaction products as plasma expanders.

EP-A-0 406 623 discloses the use of the products of the reaction of polyaspartimides with amino compounds as coating agents and/or release-slowing agents for pharmaceutical forms of therapeutic agents and for foodstuffs and other consumables. The reactions are carried out in dimethylformamide as solvent.

As is evident from the abovementioned prior art, the reaction of polyaspartimide is carried out in solvents such as dimethylformamide or dimethyl sulfoxide. The removal of these solvents from the reaction products is industrially elaborate. In addition, dimethylformamide is toxic, not least embryotoxic.

OBJECTS OF THE INVENTION

It is an object of the present invention to provide an improved process for preparing products of the reaction of polyaspartimide and compounds containing NH groups. It is another object of the present invention to indicate novel applications of products of the reaction of polyaspartimides and compounds containing NH groups.

The first object mentioned is achieved by a process for preparing products of the reaction of polyaspartimides and amino acids where amino acids are reacted with polyaspartimides in aqueous medium at pH values at which at least 5% of the amino groups in the amino acids are in non-protonated form in equilibrium with the protonated form.

The second object is achieved by using products of the reaction of polyaspartimides with amino acids, alkanolamines or aminated $C_1$–$C_{30}$-fatty alcohol alkoxylates which contain as copolymerized units up to 50 mol % of ethylene oxide and/or propylene oxide per mole of fatty alcohol as additive to detergents and cleaners, as scale inhibitor or as dispersant.

DESCRIPTION OF THE PREFERRED EMBODIMENTS

The polyaspartimides suitable as starting material can be prepared by all the known processes, eg. by polycondensation of L- or DL-aspartic acid at from 190° to 270° C., by polycondensation of L- or DL-aspartic acid in the presence of 0.1–10 mol of phosphoric acid, polyphosphoric acid, phosphorous acid, hypophosphorous acid or hydrochloric acid per mole of aspartic acid. With amounts of at least 2 mol of phosphoric acid per mole of aspartic acid, the polycondensation of the aspartic acid is carried out as a solution polycondensation, whereas in the presence of smaller amounts of phosphoric acid the polycondensation takes place in a continuous solid or highly viscous phase. Polyaspartimide can also be prepared from the ammonium salts or amides of fumaric acid, maleic acid or malic acid by heating at up to 250° C. Maleamic acid and the ammonium salt of maleamic acid are particularly preferably obtained by reacting solid or molten maleic anhydride with gaseous ammonia in the form of a solid/gas phase reaction. The polyaspartimide obtained by polycondensation of acetylaspartic acid can also be used as starting material. The polyaspartimides normally have K values from 8 to 50 (determined by the method of H. Fikentscher in 1% strength solution in dimethylformamide at 25° C.). The polyaspartimides are, as a rule, modified in such a way that 0.01–1 mole of amino acids, alkanolamines or aminated $C_1$–$C_{30}$-fatty alcohol alkoxylates are added per mole of aspartimide unit.

Amino acids suitable for modifying the polyaspartimides are all those having at least one free NH group. Examples are L- or DL-amino acids such as all amino dicarboxylic acids such as aspartic acid, glutamic acid and cystine, neutral amino acids such as glycine, alanine, β-alanine, valine, leucine, methionine, cysteine, aminocaproic acid and caprolactam, asparagine, isoasparagine, glutamine and isoglutamine, N-methylamino acids such as N-methylglycine, amino sulfonic acids such as taurine, hydroxy carboxylic acids such as hydroxyproline, serine and threonine and imino carboxylic acids such as proline and iminodiacetic acid, and aromatic and heterocyclic amino acids such as anthranilic acid, tryptophan, tyrosine and histidine, and amino tricarboxylic acids such as α- or β-aminotricarballylic acid, basic diamino carboxylic acids such as lysine, lysine hydrochloride, arginine, histidine and α-aminocaprolactam.

The reaction of the amino acids with polyaspartimides takes place in aqueous medium at pH values at which at least 5% of the amino groups in the amino acids are in non-protonated form in equilibrium with the protonated form. The choice of the pH of the aqueous medium influences the charge on the amino acids and hence also their reactivity.

The dissociation behavior of amino acids is characterized by $pK_a$ values. Neutral amino acids such as glycine have two $pK_a$ values $pK_{a1}$ and $pK_{a2}$. Amino dicarboxylic acids and diamino carboxylic acids have 3 $pK_a$ values $pK_{a1}$, $pK_{a2}$ and $PK_{a3}$ (see Jakubke, Jeschkeit, Aminosäuren, Peptide, Proteine, Verlag Chemie, page 40). Depending on the structure of the amino acids, the pH of the reaction solution is adjusted to the following minimum values:

neutral amino acids are adjusted to pH values above the iso-electric point, preferably above $pK_{a2}$, where more than 50% of the amino groups are in non-protonated form.

Amino dicarboxylic acids are adjusted to pH values which correspond to the arithmetic mean of the 2nd and 3rd dissociation constants, ie. at pH values above ½ ($PK_{a2}$+ $pK_{a3}$), preferably at pH values above $pK_{a3}$.

Diamino carboxylic acids are adjusted to pH values which correspond to the arithmetic mean of the 1st and 2nd dissociation constants, ie. at pH values above ½ ($PK_{a1}$+ $PK_{a2}$), preferably at pH values above $pK_{a2}$.

Examples of dissociation constants for the individual carboxyl and amino groups are to be found in the literature (cf. Jakubke, Jeschkeit, Aminosäuren, Peptide, Proteine, Verlag Chemie 1982, pages 38–40).

Specific examples of preferred amino acids are:

| Glycine | pH > 6.0 | preferably pH > 9.6 |
| Aspartic acid | pH > 6.6 | preferably pH > 9.6 |
| Glutamic acid | pH > 7.1 | preferably pH > 9.6 |
| Lysine | pH > 5.5 | preferably pH > 9.1 |

The reactivity of the amino groups of amino acids can be increased by using amino acids in neutralized form.

For example, in the case of amino dicarboxylic acids, amino tricarboxylic acids, neutral amino acids or diamino carboxylic acids, one, two or three carboxyl groups are completely or partially neutralized by alkalis during the reaction with the polyaspartimide so that the pH is above 6, preferably from 8 to 13, and at least 5% of the amino groups are in non-protonated form in the protonation equilibrium.

Up to 2 mol of alkali are added per mol of amino dicarboxylic acid, and up to 1 mol of alkali is added in the case of amino monocarboxylic acids and diamino carboxylic acids, continuously or batchwise during the reaction. Diamino carboxylic acids can also be reacted without the addition of alkalis. However, to increase the reactivity they can also be used in a form which is completely or partially neutralized with bases.

Amino acids are stored in the form of hydrochlorides for greater stability. For example, lysine hydrochloride is a form of lysine which is conventionally marketed. If lysine hydrochloride is employed it is possible to use up to 2 mol of alkalis per mol of lysine hydrochloride, with 1 mol of alkali being used to neutralize the hydrochloric acids.

The amino acids can be neutralized before or during the reaction with polyaspartimide. The neutralization is carried out with bases such as alkalis, for example sodium hydroxide, potassium hydroxide, sodium bicarbonate, potassium bicarbonate, sodium carbonate and potassium carbonate, and tertiary amines such as triethanolamine and triethylamine, primary amines such as butylamine and ethanolamine, or secondary amines such as morpholine. Ammonia is also a suitable base, and it is likewise possible to use barium and calcium hydroxides.

The reactions are carried out in water as diluent in which the amino acids are soluble in neutralized form. The amino acid concentration should be chosen so that the resulting amino acid salt solutions are as concentrated as possible or saturated. 1–20, preferably 5–15, molar amino acid salt solutions are preferably employed.

Amino acids which contain only one amino group are normally adjusted to a pH of at least 7, while amino acids containing two amino groups can also be reacted in the form of the free acids. The reaction is normally carried out at pH values above 6, preferably in the pH range from 8 to 13. Higher pH values and higher concentrations of amino acids, and higher temperatures, lead to a faster reaction. The reactions are normally carried out at from 0 to 100, preferably 20° to 70° C. The reaction times depend on the reactivity of the amino acids and are from 1 to 20 hours.

A particularly economic variant of the process comprises initially carrying out the polycondensation of aspartic acid to give aspartimide, stopping the polycondensation at a conversion of about 50 to 95% so that free aspartic acid is still present in the reaction mixture. For example, aspartic acid crystals or powder can be only 80% polycondensed at from 200° to 280° C. and subsequently the unreacted aspartic acid can be added on to the resulting polyaspartimide in aqueous medium by suspending the aspartic acid-containing polyaspartimide in water and adding a base so that the pH is above 6, preferably from 8 to 13. Alkali is continuously added until the polycondensate has dissolved. The aqueous solution then contains the product of the reaction of aspartic acid and polyaspartimide in the salt form.

The reaction products may contain the structural units I to IV

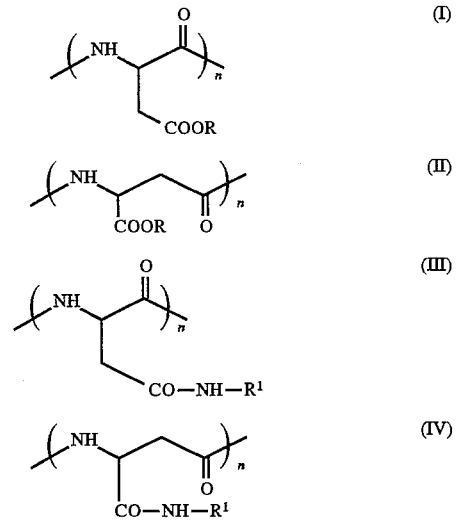

In structures I to IV, R is H, alkali metal, alkaline earth metal, ammonium and $H.H_2N^+$—$R^1$ with $R^1$=amino-acid residue and n=3 to 3000, preferably n=5 to 1000.

Structure I contains α-linked aspartic acids in the acid form or in the form of the alkali metal, alkaline earth metal or ammonium salts and linked in salt form to the amino acid. Structure II shows β-linked aspartic acids with the relevant meanings for the substituent R, while structure III depicts α-linked aspartic acids which contain the amino-acid residue linked in amide form, and structure IV represents a β-linked aspartic acid which contains the amino-acid residue linked in amide form. The proportions of structures I to IV in the reaction product can be in any ratio with respect to one another. The amino acids are preferably present in the reaction products as structures III and IV together in an amount of at least 1, preferably 5–70, mol % based on the amino acid used.

Information about the structure of the reaction products and the proportion of structural elements I to IV present in the reaction products can be obtained from H-NMR and C-NMR, preferably using $D_2O$ as solvent. The α—CH signals in the spectra of amino acids are suitable for indicating whether the amino group in the amino acid is in free form or is linked in amide form to a carboxyl group of the polyaspartic acid. It is possible to establish from the ratio of the intensity of the signals what proportion of the amino acid has reacted with polyaspartic acid to form structural units I to IV and what proportions of structural elements I to IV are present.

Polyaspartimides can also be reacted in aqueous medium with alkanolamines or with aminated $C_1$-$C_{30}$-fatty alcohol alkoxylates. The reaction is preferably carried out in the pH range from 7.5 to 13. Examples of suitable alkanolamines are ethanolamine, diethanolamine, 2-amino-1-propanol, 3-amino-1-propanol, aminobutanols such as 4-amino-1-butanol, 2-amino-1-butanol and 6-amino-1-hexanol. Also suitable are aminated fatty alcohol alkoxylates which are obtainable by alkoxylation of $C_1$–$C_{30}$-alcohols with ethylene oxide, propylene oxide or mixtures of ethylene oxide and propylene oxide. The fatty alcohol alkoxylates can contain either ethylene oxide and propylene oxide blocks or ethylene oxide and propylene oxide units in random distribution. The aminated fatty alcohol alkoxylates are prepared, for example, by initially reacting a fatty alcohol or oxo alcohol, preferably $C_1$–$C_{30}$-alcohols, with ethylene oxide and/or propylene oxide, and subsequently aminating the reaction products. From 1 to 100, preferably 3 to 50, mol of ethylene oxide and/or propylene oxide are used per mole of fatty alcohol. Aminated fatty alcohol alkoxylates which are preferably employed are obtained, for example, by reacting $C_1$–$C_{20}$-alcohols with 3 to 25 mol of ethylene oxide per mole of fatty alcohol and subsequently aminating.

The products of the reaction of polyaspartimides and amino acids, alkanolamines or aminated fatty alcohol alkoxylates described above are used as additive to powdered or liquid reduced phosphate or phosphate-free detergents and cleaners. Products of the reaction of polyaspartimide with N-(aminoethyl)piperazine, N-(aminoethyl)imidazole, N-(aminopropyl)imidazole or 2-aminocaprolactam can act as antiredeposition agents and as color-transfer inhibitors. The amounts used are in the range from 0.5 to 30, preferably 1 to 10, % by weight. The amounts used in dishwashing compositions and cleaners for mechanical bottlewashing are up to 50% by weight.

Reduced phosphate detergents and cleaners mean those formulations which contain less than 25% by weight of phosphate calculated as pentasodium triphosphate. The composition of powder detergent formulations can vary widely. Phosphate-free detergent formulations, in particular concentrated compact powder detergents, can contain besides the conventional surfactant contents as builders zeolite and/or sheet silicates in the form of crystalline or amorphous powdered hydrated sodium silicates. Silicates of this type are known, see EP-B-0164514 and EP-A-0444415. The same applies to the composition of cleaner formulations. Detergent and cleaner formulations normally contain surfactants in amounts of from 1 to 50% by weight, and in some cases even higher amounts of surfactant, with or without builders. These data apply both to liquid and to powder detergent and cleaner formulations. Examples of the composition of detergent formulations customary in Europe, the USA and Japan are to be found, for example, in tables in Chemical and Engn. News, 67 (1989) 35 and in Ullmanns Encyklopädie der technischen Chemie, Verlag Chemie, Weinheim 1983, 4th Edition, pages 63–160. Further details of the composition of detergents and cleaners can be found in WO-A-90/13581.

The reaction products to be used according to the invention can be incorporated without difficulty into detergent and cleaner formulations and, because of the fact that they greatly reduce the viscosity of water-containing surfactants, can be used as viscosity reducers.

The reaction products described above are also suitable as scale inhibitors used, for example, in the desalination of sea water, to prevent incrustation with simultaneous inhibition of corrosion in water-carrying systems, eg. in cooling and hot water circulations, boiling and vaporizing units, heat exchangers, turbines and pumps or as scale inhibitors in the evaporation of sugar syrups. Scale inhibitors are normally added to the aqueous medium to be treated in amounts of from 0.1 to 1000, preferably 1 to 500, ppm.

The products of the reaction of polyaspartimides and amino acids, alkanolamines or aminated $C_1$–$C_{30}$-fatty alcohol alkoxylates which contain as copolymerized units up to 100 mol of ethylene oxide and/or propylene oxide per mole of fatty alcohol are also used as dispersants, eg. for dispersing pigments in water to prepare highly concentrated pigment suspensions, eg. such reaction products are used to prepare aqueous suspensions of iron, coal, minerals, clays, loam, oxide and sulfide minerals, phosphates, sulfates, carbonates, chalk and gypsum. The amounts used as dispersant are in the range from 0.1 to 5, preferably 0.2 to 2, % of the weight of the pigment.

The products of the reaction of polyaspartimides and amino acids, alkanolamines or aminated $C_1$–$C_{30}$-fatty alcohol alkoxylates which contain as copolymerized units up to 50 mol % of ethylene oxide and/or propylene oxide per mole of fatty alcohol have K values in the range from 8 to 150, preferably 9 to 100 (determined by the method of H. Fikentscher in aqueous solution at pH 7 on the sodium salt of the reaction product and at 25° C.).

Unless otherwise indicated, the percentages in the examples are based on weight. The K values were determined by the method of H. Fikentscher, Cellulose-Chemie, 13 (1932) 58–64 and 71–74, in 1% by weight solution in the form of the sodium salts at pH 7 and 25° C. The K values of polyaspartimide were determined in dimethylformamide at a polymer concentration of 1% by weight and at 25° C.

EXAMPLES

Preparation of Polyaspartimide

L-Aspartic acid crystals are condensed in a porcelain dish at 220° in an oven until the weight remains constant. The polycondensate has a K value of 18.6 in 1% strength solution in dimethylformamide.

Comparative Example 1

1 g of the polyaspartimide described above is stirred in 20 ml of water at 60° C., and 10% strength aqueous sodium hydroxide solution is added dropwise so that the pH of the solution is from 8 to 10. A clear aqueous polymer solution with a pH of 9 is obtained. Gel permeation chromatography (calibrated with a polyacrylate standard) showed a weight average molecular weight $M_w$ of 6000 and a number average molecular weight $M_n$ of 2600.

Examples 1 to 6

Preparation of Reaction Products 1 to 6

The amount of sodium hydroxide indicated in Table 1 is introduced into a 100 ml Erlenmeyer flask and dissolved in 20 ml of water. Then, while cooling in ice, 0.1 mol of the amino acid indicated in Table 1 is introduced in portions and the mixture is stirred while cooling in an ice bath until a clear solution of the amino acid salt results. Then 10 g of polyaspartimide (equivalent to 0.1 mol of imide units) are added in one portion and the resulting suspension is stirred at the temperature and for the time indicated in Table 1. The resulting solution is brownish and clear or slightly cloudy. Progress of the reaction is evident from the fact that the insoluble polyaspartimide gradually dissolves. The pH resulting after the reaction is indicated in Table 1. Any turbidity of the mixture remaining after completion of the reaction can be eliminated by adding 15% strength aqueous sodium hydroxide solution to a pH of 12–13. The clear solution can then be adjusted to the required pH without precipitation or turbidity occurring.

TABLE 1

| Ex. | NaOH [mol] | 0.1 mol of amino acid [g] | [g] | Reaction conditions [Time] | [Temp. °C.] | Remarks | % of structures III and IV linked in amide form |
|---|---|---|---|---|---|---|---|
| 1 | 0.2 | 8 | 13.3 DL-aspartic acid | 8 | 50 | cloudy viscous reaction solution, pH = 11 | 55 |
| 2 | 0.2 | 8 | 13.3 L-aspartic acid | 8 | 50 | cloudy, viscous reaction solution, pH = 11 | 26 |
| 3 | 0.1 | 4 | 7.5 glycine | 2 | 40 | fast reaction, clear reaction solution, pH = 10 | 60 |
| 4 | 0.1 | 4 | 8.9 β-alanine | 2 | 20–40 | reaction even at room temperature, clear reaction solution, pH = 10 | 50 |
| 5 | 0.1 | 4 | 12.5 taurine | 2 | 20–40 | reaction even at room temperature, reaction mixture diluted with 30 ml of water to a clear solution | 50 |
| 6 | 0.2 | 8 | 18.2 L-lysine hydro-chloride | 2 | 20 | clear reaction solution pH = 11 | 50 |

The reaction products described in Table 1 are tested for their dispersing capacity (CD test) in the following examples.

CD test (Clay Dispersion Test)

Finely ground china clay SPS 151 is used as model of particulate soil. 1 g of clay is vigorously dispersed in 98 ml of water with the addition of 1 ml of a 0.1% strength solution of the sodium salt of the polyelectrolyte in a 100 ml cylinder for 10 minutes. Immediately after the stirring, a 2.5 ml sample is taken from the middle of the cylinder and, after dilution to 25 ml, the turbidity of the dispersion is determined using a turbidimeter. Samples are again taken after the dispersion has stood for 30 and 60 minutes and the turbidity is determined as before. The turbidity of the dispersion is reported in NTU (nephelometric turbidity units). The measured turbidity, and thus the stability of the dispersion, is inversely related to the settling of the dispersion during storage. The second physical variable determined is the dispersion constant which describes the time course of the sedimentation process. Since the sedimentation process can be described approximately by a monoexponential time law, $\bar{\tau}$ indicates the time in which the turbidity falls to 1/e of the initial level at time t=0.

A higher value for $\bar{\tau}$ means a slower settling of the dispersion.

TABLE 2

| Reaction product of Example | Turbidity in NTU t = 0 | t = 30 (min) | t = 60 | $\bar{\tau}$ [min] |
|---|---|---|---|---|
| Ex. | | | | |
| 7 | 1 | 740 | 640 | 590 | 283.7 |
| 8 | 2 | 750 | 630 | 580 | 261.4 |

TABLE 2-continued

| Reaction product of Example | Turbidity in NTU t = 0 | t = 30 (min) | t = 60 | $\bar{\tau}$ [min] |
|---|---|---|---|---|
| 9 | 3 | 760 | 650 | 610 | 324.4 |
| 10 | 4 | 760 | 620 | 590 | 358.4 |
| 11 | 5 | 750 | 630 | 590 | 305.7 |
| 12 | 6 | 750 | 640 | 600 | 319.3 |
| Comparative Example 1 | | 740 | 620 | 520 | 170.0 |

As is evident from the results in Table 2, the products of the reaction of polyaspartimides and amino acids, which contain polyaspartylamino acids, have better dispersing properties than sodium polyaspartate, prepared by alkaline hydrolysis of polyaspartimide.

We claim:

1. A process for preparing products of the reaction of polyaspartimides and amino acids, which comprises reacting amino acids with polyaspartimides in aqueous medium at pH values at which at least 5% of the amino groups in the amino acids are in non-protonated form in equilibrium with the protonated form.

2. The process of claim 1 wherein said amino acids are selected from the group consisting of amino dicarboxylic acids, neutral amino acids, N-methylamino acids, aminosulphonic acids, hydroxycarboxylic acids, iminocarboxylic acids, aromatic amino acids and heterocyclic amino acids.

3. The process of claim 1, wherein said amino acids are selected from the group consisting of aminodicarboxylic acids, aminotricarboxylic acids, neutral amino acids and diaminocarboxylic acids, and one, two or three carboxyl groups of said acids are completely or partially neutralized by alkali during the reaction with said polyaspartimides.

4. The process of claim 3, wherein the neutralization is conducted such that the pH of said aqueous medium is above 6.

5. The process of claim 4 wherein said pH is from 8 to 13.

6. The process of claim 1, wherein during the process of polycondensation of aspartic acid to produce aspartimide, the polycondensation reaction is stopped at a conversion of about 50 to 95%, so that free aspartic acid is present in the reaction mixture, the unreacted aspartic acid is subsequently reacted onto the polyaspartimide in aqueous medium by suspending the aspartic acid-containing polyaspartimide in water and adding a base so that the pH is above 6, to form an aqueous solution which contains the product of the reaction of aspartic acid and polyaspartimide in the salt form.

7. A detergent composition comprising a surfactant, a builder, and an additive selected from the group consisting of (a) a reaction product obtained by the process of claim 1, (b) a reaction product of polyaspartimides with alkanolamines, (c) a reaction product of polyaspartimides with aminated $C_1$–$C_{30}$-fatty alcohol alkoxylates having up to 50 mol of ethylene oxide and/or propylene oxide per mol of fatty alcohol.

8. A composition comprising an inorganic pigment and, as a dispersing agent, a material selected from the group consisting of (a) a reaction product obtained by the process set forth in claim 1, (b) a reaction product of polyaspartimides with alkanolamines, and (c) a reaction product of polyaspartimides with aminated $C_1$–$C_{30}$-fatty alcohol alkoxylates which contain as copolymerized units up to 50 mol of ethylene oxide and/or propylene oxide per mol of fatty alcohol.

9. A method of inhibiting scale or corrosion in a water carrying system subject to scale incrustation or corrosion during use comprising adding to the aqueous medium of said system, as a treating agent, from 0.1 to 1,000 ppm of an inhibitor selected from the group consisting of (a) a reaction product produced by the process of claim 1, (b) a reaction product of polyaspartimides with alkanolamines, (c) a reaction product of polyaspartimides with aminated $C_1$–$C_{30}$-fatty alcohol alkoxylates which contain as copolymerized units up to 50 mol of ethylene oxide and/or propylene oxide per mol of fatty alcohol.

10. An aqueous suspension comprising a pigment material and a suspending agent, said suspending agent being selected from the group consisting of (a) a product produced by the process of claim 1, (b) a reaction product of polyaspartimides with alkanolamines, (c) a reaction product of polyaspartimides with aminated $C_1$–$C_{30}$-fatty alcohol alkoxylates which contain as copolymerized units up to 50 mol of ethylene oxide and/or propylene oxide per mol of fatty alcohol.

* * * * *